Jan. 10, 1961   A. JENSEN   2,967,463
TRACER SYSTEM FOR MACHINE TOOL
Filed March 25, 1958   5 Sheets-Sheet 1

INVENTOR.
AAGE JENSEN
BY
Wheeler, Wheeler & Wheeler
ATTORNEYS

Jan. 10, 1961 A. JENSEN 2,967,463
TRACER SYSTEM FOR MACHINE TOOL
Filed March 25, 1958 5 Sheets-Sheet 3

INVENTOR.
AAGE JENSEN
BY
Wheeler, Wheeler + Wheeler
ATTORNEYS ated Jan. 10, 1961

United States Patent Office 2,967,463
Patented Jan. 10, 1961

2,967,463

TRACER SYSTEM FOR MACHINE TOOL

Aage Jensen, 2830 Rapids Drive, Racine, Wis.

Filed Mar. 25, 1958, Ser. No. 723,720

19 Claims. (Cl. 90—13.5)

This invention relates to improvements in mechanisms for automatically operating a metal-cutting machine tool from a tracer following the surfaces of a three-dimensional pattern.

When a tracer-control vertical spindle milling machine is to be used for shaping three-dimensional workpieces as in die sinking, it is desirable that the control mechanism be sufficiently sensitive so that all surfaces can be given a fine finish with a minimum of supervision of the machine. In the present invention, separate hydraulic motors are provided to secure vertical and continuous movements of the knee, horizontal and incremental movements of the saddle and horizontal and continuous movements of the table. The knee motor control valve is actuated by a tracer mounted on the machine column and co-acting with a pattern on the machine table and means are provided for preventing overrun during upward movement of the knee.

An adjustable leverage acts on a bell crank by which the tracer moves a valve controlling flow of pressure fluid to the knee motor and the leverage is actuated by a rod carried by the knee. Flow of fluid pressure to the table motor is under control of another valve also actuated by the tracer and a third valve receives the fluid and controls its flow for determining the direction of table movement. The two tracer-actuated valves are continuously oscillated by a hydraulic piston to which pressure fluid flow is controlled by a valve actuated by the piston oscillation of the tracer-controlled valves. The tracer valve oscillating means operates automatically as soon as and continues to operate as long as pressure fluid is supplied thereby maintaining sensitivity of the tracer-controlled valves to minute tracer movements. The saddle motor is controlled by another valve and both the table direction-control valve and the saddle control valve are responsive to table movement relative to the saddle. A fluid pressure supply source and the above valves are so interconnected that the machine operates automatically during any desired number of cuts in a single horizontal plane. The tracer mounting makes the tracer especially sensitive to change in pattern contours in all three directions so that one entire series of cuts can be made with one setting of the system and without supervision by the operator. The additional motor structure provides means for limiting the stroke of the motor and for reversing its direction of operation.

Figures 1, 7:
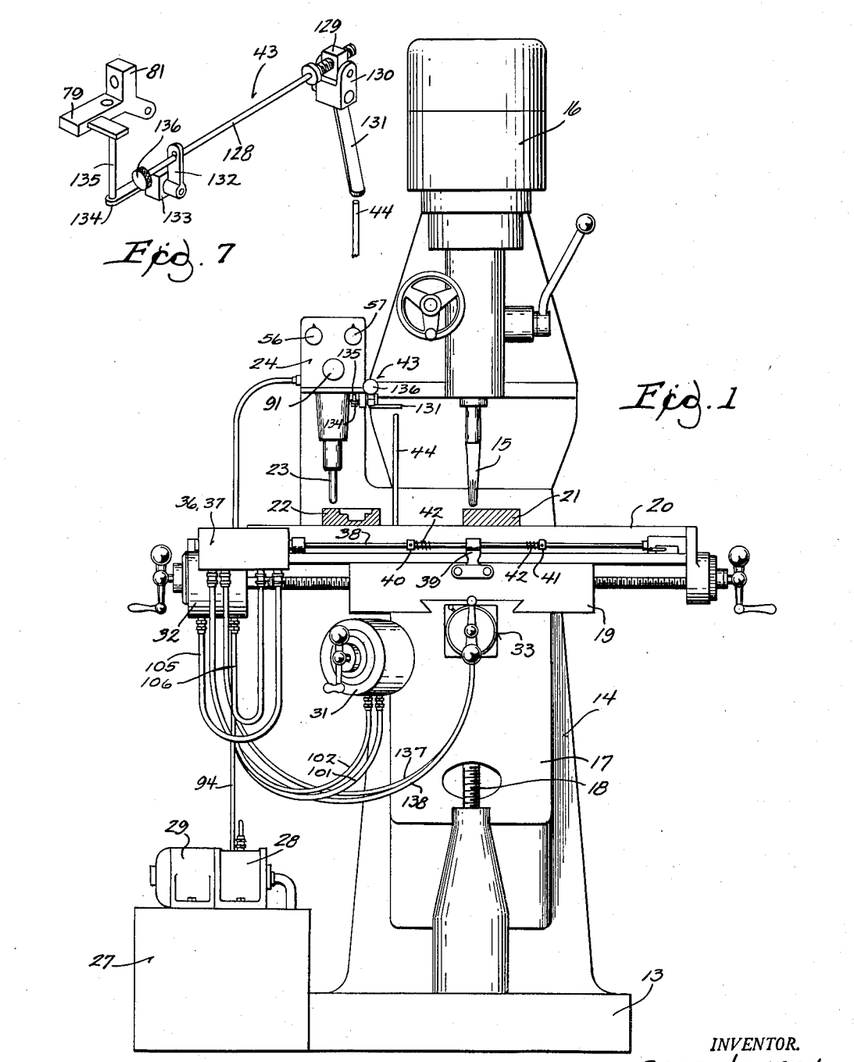
Figure 1 is a front elevation of a known vertical shaft milling machine to which are applied the tracer, the hydraulic pressure supply control, the hydraulic motors and the valves controlling direction of and continuity of movement of some of the motors of the present invention.
Figure 7 is a perspective view of the safety stops limiting action of the fluid pressure supply control valves to the knee and table motors upon movement of the machine knee by a given amount.

Referring to the drawings, numerals 13 and 14 respectively, designate the base and the column of a milling machine having its spindle and cutter 15 mounted vertically for adjustment and for driving from known means 16. The machine bracket or knee 17 is slidably mounted on the column and movable vertically by the action of a nut (not shown) cooperating with an elevating screw 18 extending from the base into the knee. A saddle 19 is slidably mounted on the knee 17 to move toward or away from the column 14 and a table 20 is slidably mounted on the saddle 19 to move from left to right (and vice versa) as shown in the drawing. The above structure identifies the usual vertical spindle milling machine and no further description of such known structure is required for an understanding of this invention.

Figures 5, 6:
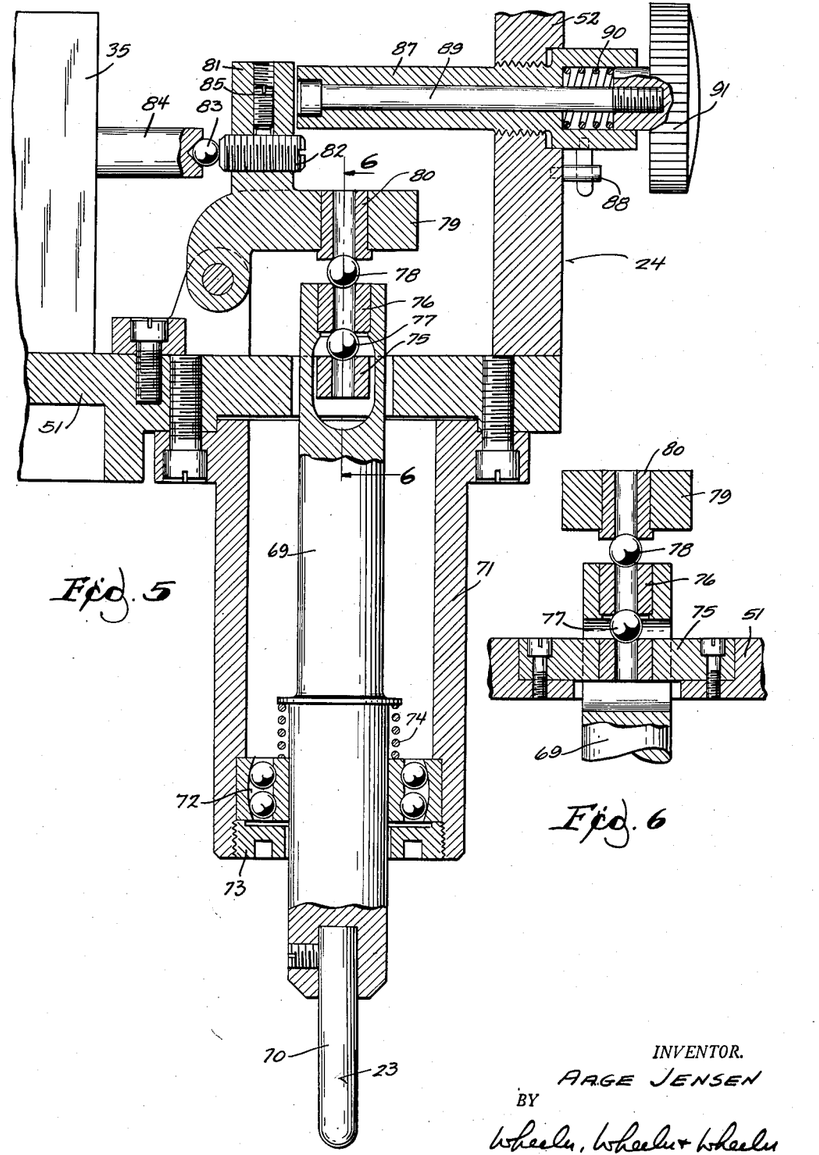
Figure 5 is a cross-sectional view through the tracer and a portion of its mounting.
Figure 6 is a cross-section taken on line 6—6 of Figure 5.

Table 20 carries workpiece 21 to be shaped according to pattern 22, also mounted on the table, as the surfaces of the pattern are followed by a tracer 23. The tracer is movably mounted in a tracer head 24 which also carries other subassemblies to be described. A source of fluid under pressure is shown as tank 27 on which is mounted a pump 28 driven by an electric motor 29. The pump delivers fluid under pressure by way of pressure and return lines, a terminal block and valves as best shown in Figure 6, to a number of hydraulic motors for operating the knee, saddle and table of the milling machine. The fluid returns to or is drained back to the tank for reuse in the hydraulic system by lines separately identified in Figure 6, which illustrates the connections thereof.

Movement of the knee 17 and of the table 20 are produced by the operation, respectively, of hydraulic motor 31 and 32 which are reversible motors employing a part of the construction shown in Patent 2,398,313 issued to me on April 9, 1946. Movement of the saddle 19 is produced by the operation of hydraulic motor 33 which rotates in either direction in an arc of less than 360° and which is described in detail below. Hence, the motors 31, 32 are herein designated as rotary motors while motor 33 is designated as an oscillatory motor. Two valve members 34, 35 are located in the tracer head 24 for control of pressure supply to the knee motor 31 and the table motor 32 and two valve members 36, 37 are combined into a single structure and mounted on an edge of the table 18 for further control of pressure to the table motor and control of saddle motor 33. Valves 34, 35 are operated by tracer 23 following a pattern, as is described below. The combined valves 36, 37 are operated by a rod 38 moving through a bracket 39 on the saddle 19, adjustable collars 40, 41 on the rod engaging the saddle bracket upon movement of the table relative to the saddle. Each of such collars is provided with a spring 42 for cushioning the engaging action.

A safety stop mechanism (see Fig. 7) for the pressure flow control valves 34, 35 is designated 43 and is mounted in the tracer head 24, for engagement by a post 44 on the knee 17 as will be specifically described.

The tracer head 24 (see Figure 2) comprises a post 50 mounted on the machine column 14 for vertical and rotational adjustment and has fixed thereto a base 51 and a front plate 52 and carries a terminal block 53, pressure flow control valves 34, 35 and fluid flow lines between the terminal block and such valves. The pressure supply lines to valves 34, 35 are, respectively, provided with hand valves 54, 55 separately connected by rods with hand wheels 56, 57 rotatably supported by the tracer head front plate. The tracer head also carries the mounting for the tracer 23 and a leverage by which the tracer acts on the valves 34, 35 as will be described.

Figure 2:
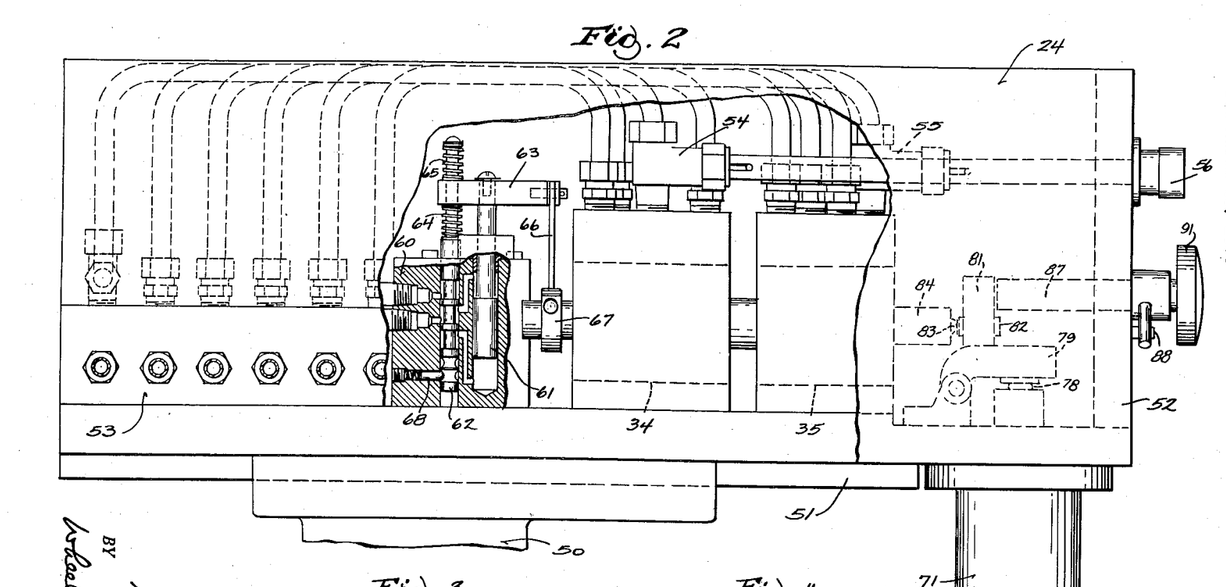
Figure 2 is a view partially in side elevation and partially in section of the pressure supply control valves and their connections and of oscillating means for such valves.

Means is provided for rotary oscillation of valves 34, 35 to overcome inertia thereof. Such means is best shown in Figure 2 as comprising a block 60 bored to provide cylinders, respectively for a power piston 61 and a piston-like valve 62 connected with the power piston cylinder for controlling fluid pressure supply thereto from a pressure line and discharge of fluid therefrom through a drain line. The stem of piston 61 bears a yoke 63 having an end receiving the stem of valve 62 and acting on either of two springs 64, 65 on the valve stem. The other end of the yoke 63 is pivotally connected with one end of a link 66 which is pivoted at its other end to a crank 67 attached to the stem of valves 34, 35. Valve 62 is formed with rounded grooves to receive a spring pressed and screw adjusted detent 68 which limits movement of such valve into either one of two positions as said valve controls the rate of oscillation of the piston 61.

The tracer 23 (see Figures 5 and 6) comprises a spindle 69 and a stylus 70 in a tubular mounting 71 depending from the tracer head base 51 and axially aligned with a hole through the base. Tube 71 receives a self-aligning ball bearing 72 with arcuate raceway which permits the tracer spindle and stylus to rotate and to tilt about its axis, the bearing being held against a shoulder in the tube by the ring 73. The spindle 69 is carried in generally vertical position by the bearing 72 and the weight of the spindle on the bearing is balanced by a spring 74 so that the spindle tends to be approximately centered in the tube 71 and the tracer head base 51. The tracer spindle 69 is slotted for extension therethrough of a bridge 75 across the hole in the tracer head base 51, and its upper end carries a bushing 76 providing a seat for a ball 77 also seated in the bridge 75. Another ball 78 acts between the upper end of the tracer spindle and one arm 79 of a bell crank leverage.

The base for the bell crank leverage is attached to the tracer head base 51 so that the bell crank arm 79 extends over the end of the tracer spindle where a bushing 80 provides a socket for the spindle ball 78. Another bell crank arm 81 carries an adjusting screw 82 engageable through a ball 83 with stem 84 of valve 35 and such adjusting screw is held in given position by a locking screw 85. Secondary adjusting means for setting the depth of each cut, may also act on the bell crank 79—81 and comprises a sleeve 87 threaded into the tracer head front plate 52 and sleeve adjustment is limited by a stop 88. A stem 89 extends through the sleeve and is under the action of a spring 90. A hand button 91 allows pressing of stem 89 against the bell crank to cause it to bear on the valve stem 83 whenever desired to supersede the action of the tracer 23 on such stem. The sleeve 87 is for the purpose of setting the valves 34, 35 in neutral position so that the machine may be used for milling free from tracer control.

Figure 8:
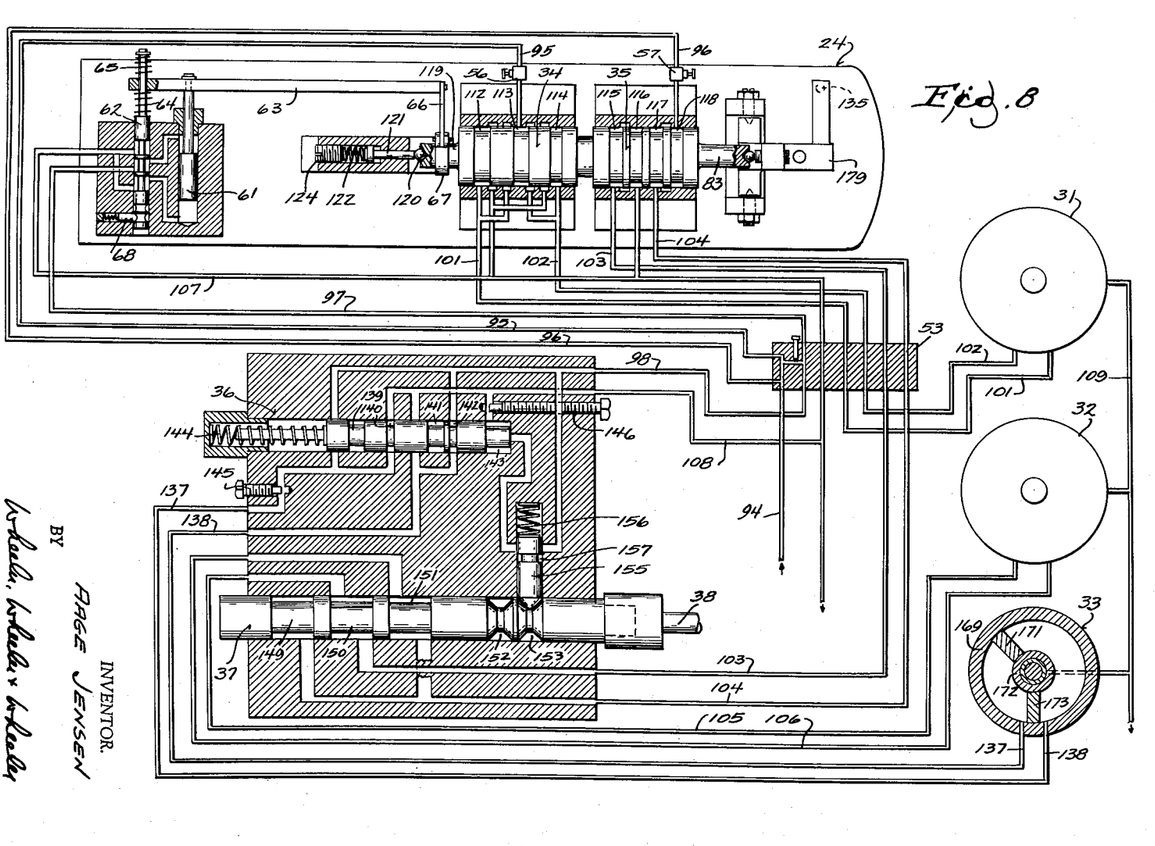
Figure 8 is a diagram showing the hydraulic pressure flow circuits, the diagram also generally indicating the structure of various valves controlling the liquid pressure flow, and the arrangement of various subassemblies in the head or mounting for the tracer and some of the valves.
Figure 9:
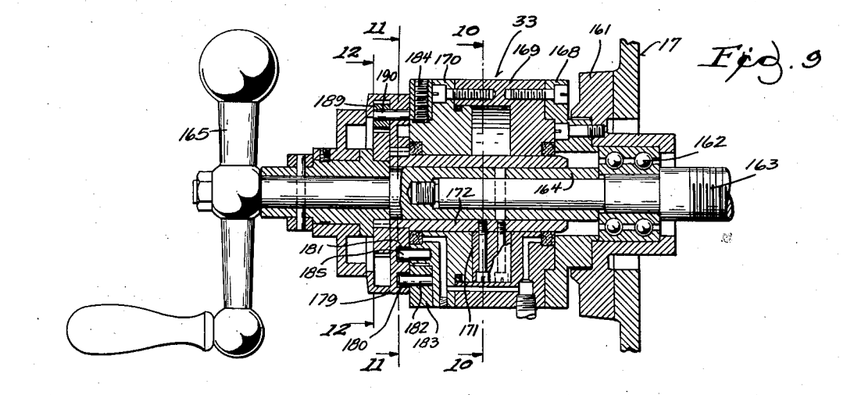
Figure 9 is an axial cross-section of the hydraulic motor for operating the saddle of the machine.

Referring now to Figures 1 and 8, fluid pressure from the pump 28 is supplied by way of pressure line 94 to passages in terminal block 53 connected by lines 95, 96 with pressure flow control valves 34, 35, while other passages connect by pressure line 97 with oscillator valve 62 and by pressure line 98 with valves 36, 37. The valve 34 is connected by pressure lines 101, 102 and terminal block 53 with rotary knee motor 31 and valve 35 is connected by pressure lines 103, 104, and pressure lines 105, 106 with rotary table motor 32. Valve 36 connects pressure line 98 to oscillatory saddle motor 33 by way of pressure lines 137, 138. Lines 101, 102 and 105, 106 and 137, 138 act either as supply or return lines while line 103 acts only as a return line and line 104 acts only as a supply line. Drain lines 107 and 108 lead, respectively, from valves 62, 34, 35 and 36 to reservoir 27 and drain line 109 leads from the several motors 31, 32, 33 and serve only to return leakage fluid to the sump 27.

Figure 3:
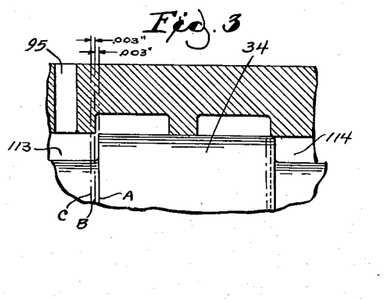
Figure 3 is an enlarged fragmental cross-section of the knee motor control valve shown in elevation in Figure 2.

The valve member 34 is shown in Figures 3 and 8 as having peripheral grooves 112, 113 and 114 so that inlet pressure from line 95 may be transmitted to outlet pressure lines 101, 102. Valve member 35 (see Figures 4 and 8) has groves 115, 116, 117 and 118 so that inlet pressure from line 96 may be transmitted to return line 103 or pressure line 104. The two valves 34, 35 are integral or connected and stems 119 and 83 extend respectively from valves 34, 35 for adjustment and continuous rotary oscillation acting on stem 119 and for actuation of the valves by tracer action on the stem 83. The stem 119 of valve 34 has a socket receiving a ball 120 held by a plunger 121 under pressure of a spring 122 which is variable by movement of a screw 124 so that both valves 34 and 35 may be set axially to bring their grooves or lands initially opposite the desired passage openings in their respective valve housings.

Assuming that oscillator piston 61 and valve 62 are in the position shown in Figure 8, pressure from inlet line 97 acts on the upper end of piston 61 while the lower end of the piston is connected to drain 107, thus pressing downward on the piston. A downward movement of piston 61 carries yoke 63 downward to compress spring 64 until the resistance of such spring is greater than the holding force of the detent 68. Valve 62 is then pressed downward to admit pressure below the piston 61 and to lift the piston which lifts yoke 63, compresses spring 65 and lifts valve 62 back to the position shown in the drawings. Each stroke of piston 61 acts through yoke 63, link 66 and crank 67 to oscillate valve members 34 and 35 so that the valves are always free and sensitive to even minute actuation by the tracer and other operating means. The speed of movement of the oscillating means is regulated by adjusting the pressure of detent 68 and it has been found that from 60 to 100 strokes per minute are satisfactory dependent upon the complexity of the workpiece being milled.

As the pattern 22 is moved by the knee, saddle and table in contact with the tracer stylus 70, the tracer spindle 74 is moved axially or tilted in its mounting as required by a surface of the pattern. All tracer movements are transmitted to the bell crank leverage 79—82 to press on the valve stem 83 and move the valves 34 and 35 axially as the pressure of the bell crank overcomes valve adjustment spring 122. In the present system such axial movement of the valves is of the order of .003 inch and cuts down or cuts off pressure through the valves 34 and 35 and varies the movement of the knee motor 31 and of the table motor 32. Hence, movement of workpiece 21 corresponds to movement of the pattern, and the workpiece is brought toward or away from the continuously rotating milling cutter 15. Initial adjustment of the tracer action is made by adjusting screw 82 but the operator can cause quick and large adjustments by striking the button 91.

Overrun upward of the knee motor 31 is prevented by a safety stop generally designated 43 (see Figure 7) and a post 44 extending from the knee 17 upward and adjacent the tracer head 24 for contact with stop mechanism 43. Such stop includes a rod 128 threaded into a nut 129 pivoted in a block 130 which is itself pivoted to the tracer head 24 and has a bar 131 extending into the path of movement of the post 44. A link 132 from rod 128 is pivoted to a block 133 from which a bar 134 extends for engagement with a pin 135 slidably mounted in the tracer head and movable into engagement with the bell crank 79—82. Upon tendency of knee 17 to move upward further than the desired depth of any cut to be made, upward pressure by the post 44 on bar 131 turns the rod 128 and bar 134 to press pin 135 against bell crank 79—82 and move valves 34 (and 35) to cut off pressure flow from the knee motor 31. A hand wheel 136 on rod 128 allows the operator to rotate the rod whenever desired and thus allows fine adjustment of the stop mechanism to any sensitivity desired.

Saddle motor 33 is controlled by valve 36 which receives pressure by way of line 98 and controls pressure transmission through the pressure-return lines 137, 138 to the saddle motor. The valve 36 is a piston-like movable member with grooves 139—143 and is under the action of spring 144 to return the valve member to given position. A pressure regulator 145 is placed in the pressure-return line 137 from valve 36 and a pressure regulator 146 is placed in a passage connected with the drain line 108 and with a portion of the valve 37 which controls the direction of movement of the table motor 32. Valve member 36 is stopped in either the position shown by abutment of one end thereof on the valve housing under the action of spring 144 or to the opposite position by abutment of the opposite valve end on the housing.

Valve 37 is also a piston-like member with grooves 149, 150 and 151 and notches 152, 153. Pressure is supplied to valve 37 by way of valve 35 and pressure-return lines 103—104 and through valve 37 to table motor 32 by way of pressure-return lines 105, 106. Valve 37 is actuated by rod 38 as table 20 moves so that the table cannot overrun in either direction. Notch 152 or 153 is engageable by a valve-detent 155 under the pressure of a spring 156. The detent has a peripheral groove 157 which may register with passages connected with pressure line 98 and the drain line 108. Thus, as valve 37 is moved toward the right by the action of the rod 38 upon pressing of the stop collar 42 on the saddle bracket 39, valve-detent 155 is shifted backward against the action of its spring 156 so that its groove 157 registers with pressure line 98. As the nose of detent 155 rides down into the notch 152, spring 156 presses the detent so that its groove 157 is brought back to the position shown in Figure 8 and valve member 36 is returned to its original position by spring 144 at a rate dependent on bleeding off of the fluid through regulator 146. Hence, movement of valve 37 is delayed so that reversals in direction of movement of table 32 occur without shock.

The saddle motor 33 is so constructed that it moves the saddle 19 by small increments from ¼–1/32″) in either direction and as pre-adjusted by the operator. Referring to Figures 9 through 12, a portion of the machine knee is indicated at 17 in Figure 9 to which is fastened a plate 161 supporting the entire saddle motor and supporting bearings 162 for the operating screw 163 of the saddle as well as the screw driving portion of the motor. An end of operating screw 163 extends into and is pinned to a sleeve-like extension 164 on which a handle 165 is mounted so that the operating screw may be turned manually if desired when parts of the motor are in particular positions. The saddle motor 33 is of the vane type with a housing comprising an end plate 168 attached to a mounting plate 161 and supporting a housing barrel 169 closed by a second end plate 170, the housing end plates and barrel defining a chamber in which a vane 171 moves.

The vane 171 is fixed to a sleeve 172 (see Figure 9) about the extension 164 of the operating screw and is capable of moving in both directions on an arc and from side to side of partition 173 which is fastened in the motor chamber between the inlet ports 174, 175 for the pressure fluid. Discharge ports 176 are provided for connection with drain line 109.

Figure 11:
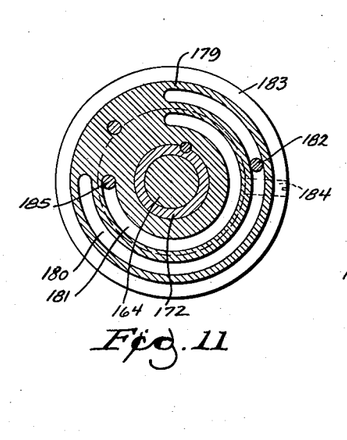
Figure 11 is a transverse cross-section on the plane of line 11—11 of Figure 9.
Figure 12:
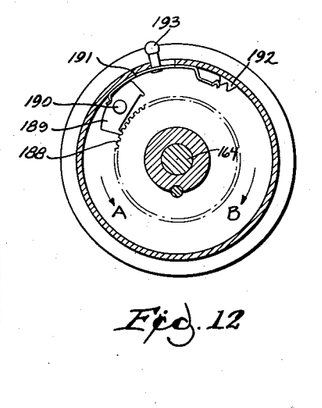
Figure 12 is a transverse cross-section on the plane of line 12—12 of Figure 9.

A motion limiting mechanism for the vane 171 is mounted on the housing end plate 170 and the sleeve 172 carrying the vane and includes a plate-like portion 179 with grooves 180, 181 formed as portions of concentric circles about the axis of the motor. A pin 182 is mounted in a ring 183 movably set into a rabbet formed in the housing end plate 170 and a lock screw 184 is provided for engaging the ring 183 with the housing end plate 170 and thereby determining the position of the pin 182 from one end of the groove 180. When the screw 184 is positioned as shown in Figure 11, the vane 171 can move only the distance between the end of the groove 180 and the pin 182 which acts as a stop. Another pin 185 is fixed in the housing end plate 170 and extends into groove 181 to limit movement of the vane 171 in the other direction.

Figure 10:
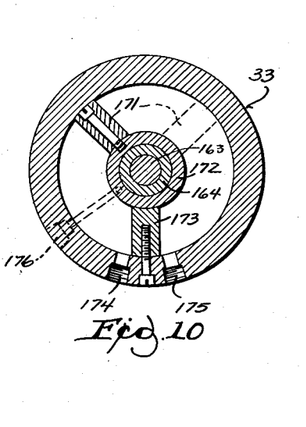
Figure 10 is a transverse cross-section on the plane of line 10—10 of Figure 9.

A ratchet and pawl mechanism (see Figure 12) controls the direction of the rotation of vane 171 and includes a ratchet 188 keyed to the shaft 164 carrying hand lever 165, and a pawl 189 rocking on a pivot 190 carried by ring 179. The pawl is double-ended and is under the action of one end of a leaf spring 191 having its other end engageable with a notch in a projection 192 when the spring is shifted along its length by the handle 193. When the spring is in the position shown in Figure 12, the end of pawl 189 remains engaged with the ratchet 188 so that movement of the vane 171 in the direction of the arrow A causes movement of the saddle screw. When the spring 191 engages in the notch of projection 192, both ends of the pawl 189 are held away from the ratchet 188 and the saddle may be moved manually by turning handle 165 as usual. When spring 191 is moved to bring its end beyond the projection 192, the end of the pawl 189, shown disengaged in Figure 12, will engage the ratchet 188 and the vane 171 may move in the direction of rotation indicated by the arrow B. With the parts in position shown in Figures 11 and 12, the vane 171 will move only from its full-line position to the dotted-line position and thereby advance the saddle screw by a fraction of an inch depending on the pitch of the screw, which determines the width of cut to be taken. Figure 10 shows the movement desired for the fine-finishing of a die cavity for molding plastics. So long as only advancement of the saddle is desired, pawl 189 and spring 191 remain in the position shown in Figure 12. However, when the saddle is to be retracted so that the power stroke of the vane 171 is to be from the dotted-line position to the full-line position, the operator shifts handle 193 clockwise so that spring 191 tips pawl 189 in the other direction. In either direction of the action of the pawl and ratchet, the saddle motor moves the screw in increments and the screw is held until its direction of rotation is voluntarily changed.

Figure 4:
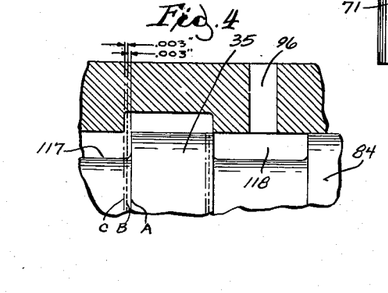
Figure 4 is an enlarged fragmental cross-section of one of the table motor control valves, also shown in elevation in Figure 2.

In Figures 3 and 4, valves 34 and 35 are shown as being capable of assuming initial position A, intermediate positions B and final positions C, the positions being indicated respectively by showing an operating edge of a land of such valves in full line, dotted line and dot-dash line. It will be seen in Figure 3 that the spacing between final position C and intermediate position B of valve 34 is .003 inch and the spacing between the intermediate position B and final position A is also .003 inch. Figure 4 shows that the spacing between the positions of valve 35 are the same and are .003 inch. Hence, both valve 34 and valve 35 can be completely closed to shut off the pressure. Valves 34 and 35 are shown in Figure 8 in the same positions as such valves have in Figures 3 and 4. Valve 36 is shown in its normal (non-reversing) position with pressure acting through pressure-return line 137, while valve 37 is shown in Figure 8 in position for table movement toward the right, valve 37 controlling action of pressure through valve 35.

Pattern 22 and workpiece 21 are placed on the table 20 in the positions shown in Figure 1 where the top surfaces of the pattern and of the workpiece are considerably below but otherwise in the same relative position to both the tracer 23 and cutter 15. The pattern 22 is shown as having a stepped cavity to be reproduced in the workpiece 21 in successive lifts and with a number of cuts per lift in which the knee, table and saddle motors go through similar cycles of operation for the several cuts to be taken in each lift. The safety stop post 44 is set for the depth of cut of the first lift. Pump 28, 29 is then started so that pressure acts through valve 34 to knee motor 21 to lift the machine knee with the pattern and the workpiece toward the tracer and cutter, respectively. Such lifting of the knee continues until the tracer (and cutter) are in contact with the upper surface of the pattern (and workpiece). During lifting movement of the knee, pressure is cut off through the valve 35 so that the table motor cannot operate.

When the tracer comes into contact with the upper surface of the pattern, valves 34, 35 are moved to intermediate positions B at which the knee motor is stopped, while the table motor moves toward the left until the tracer leaves the top surface of the pattern and moves above the left-hand first step of the pattern. There is now no pressure on the tracer which drops to the left-hand step of the pattern. The dropping of the tracer shifts valves 34, 35 to stop the table motor and reactivate the knee motor for lifting the workpiece against the cutter until the cutter has imbedded itself to the depth of the first lift as determined by the position of the knee motor stop post 44. When the cutter has reached the pre-set depth of the first lift, the tracer point will be bearing on the pattern over the left-hand first step of the pattern so that the tracer will have acted to shift valves 34, 35 to intermediate position B to stop the knee motor while the table motor again begins to move the table toward the left. Movement of the table toward the left continues until the tracer abuts laterally against the pattern.

The tracer shifts valves 34 and 35 to position C which reverses pressure action on the knee motor to lower the knee and such action continues until the tracer point comes to the plane of the top edge of the pattern. As the tracer comes out of contact with the pattern, valves 34, 35 are again shifted to intermediate position B at which pressure to the knee motor is cut off while pressure to the table motor continues so that the tracer moves over the top surface of the pattern on the side opposite that shown in Figure 1.

The table stop 40 is now engaged with the saddle bracket 39 so that the valve 37 reverses and valve 36 is opened to admit pressure to the saddle motor 33. The saddle motor moves to advance the saddle by a distance predetermined from the pitch of the saddle screw and the prior setting of the saddle motor (from one-fourth to one-thirty second inch dependent on the material being cut and the fineness of finish desired). Valve 35 is now open and valve 37 reverses the action of pressure on the table motor so that the table now moves toward the left. Advancing the saddle and moving the table toward the left puts the cutter into position for a second cut. Such table movement begins during the advancing of the saddle and continues until the tracer is again at the initial position but with the pattern and the workpiece advanced by the width of the second cut to be taken.

Valves 34, 35 and 36 are now again in the position shown in Figure 8 but valve 37 is in the position for reversal of the table (notch 152 engaged by detent 155) so that another complete cutting cycle begins from the right hand side of the workpiece. The above cycle continues to make successive cuts in a lift until the first lift is completely finished whereupon the ratchet pawl of vane motor 33 is reversed so that saddle movements are in the opposite direction from those above described. For cutting the second lift, it is again necessary to turn the post 44 downward by the depth of cut to be taken in the second lift.

It will be understood that the depth of each cut is set by turning wheel 136 of mechanism 43 and that a number of cuts may be necessary to reach full depth of each lift and that the cycle of operations is the same when a number of cuts are required to reach such depth. It will also be understood that both knee and table motors will be working when the tracer moves over a curved portion of the pattern so that both vertical and horizontal components are impressed on the cutter at the same time.

It will be seen that the present system automatically comes into action upon supply of fluid pressure thereto. The knee motor 31 and table motor 32 may rotate continuously in either diretcion for any desired amount but the saddle motor 33 oscillates only through a predetermined arc and may provide a power stroke in either direction of its movement. The extent of the arc of movement of the saddle motor is adjusted by shifting pin 182 or 185 from exteriorly of such motor and the direction of the power stroke of such motor is controlled by shifting a pawl 189 engageable with a ratchet 188 for allowing movement of the ratchet in either direction of rotation.

The first and second valves 34, 35 are located in the tracer head 24 and slide to open or close ports in their housings and are jointly adjustable to initial positions and are spring-urged toward such initial positions. A rotary oscillation is imposed on the first and second valves 34, 35 by a pressure-actuated piston 62 connected with the valves 34, 35 for positive movement thereof, the admission of pressure to different surfaces of the oscilator piston being controlled by a valve 61 actuated by the piston. Oscillator valve 61 is not however positively actuated so that the valve shifting comes substantially at the end of the strokes of piston 62. Varying the pressure of a detent 68 on the oscillating valve 61 varies the rate of movement of the oscillating piston 62 and of oscillation of the first and second valves 34, 35.

The tracer 23 is mounted in a tracer head 24 for axial movement and tilting at an angle to the tracer axis. A bell crank leverage 79—83 is swung in one direction by any axial or tilting tracer movement but tends to return to an initial position. The leverage 79—83 acts on the first and second valves 34, 35 when the leverage is moved in one direction and anti-friction bearings 75, 78, 83 are provided at several points in the tracer-leverage subassembly 79—83 to obtain free pivoting thereof. A rod 89 with a button 91 exteriorly of the tracer head 24 can act on the leverage 79—83 to adjust the leverage or to supersede tracer action on the leverage when the operator so desires.

An adjustable post 44 on the machine knee 17 acts on an adjustable leverage 43 which can shift the bell crank 79—82 and move the first and second valves 34, 35 to shut off pressure in the knee motor 31 and table motor 32. Such action occurs whenever the knee motor 31 tends to lift the workpiece 21 too high and cause cutting too far into the workpiece in a direction of knee movement. Such over-cutting is therefore safely prevented by the stop 43 even if the tracer 22 and its leverage 79—83 fail to limit knee movement.

The third and fourth valves 36, 37 are combined into a single housing mounted on the table 20 and a rod 38 extends from the fourth valve 37 through a bracket 39 on the saddle 19 for engagement of adjustable collars 40, 41 on the rod with the bracket 39. Springs 42 build up pressure engagement of the collars 40, 41 with the bracket 39 against the holding action of detent 155. Such engagement of the bracket 39 by the collars 40, 41 makes the fourth valve 37 directly responsive to table movement relative to the saddle. A valve-detent 155 is combined with the fourth valve 37 and controls the action of the third valve 36. The nose of the detent 155 acts on and is acted on by the fourth valve 37 to shift the valve-detent for admitting pressure on a surface of the third valve 36 so that the third valve may be moved in one direction by pressure acting against a return spring 144.

I claim:

1. In a system for controlling the fluid pressure actuated movement of the knee and table and saddle of a milling machine according to a pattern on the table adjacent the workpiece, the combination of a first valve for controlling transmission of fluid pressure operating the knee, a second valve in part controlling transmission of fluid pressure operating the table, a tracer mounted on the machine and following the pattern contours and movement thereby for actuating the first and second valves responsive to differences in pattern contours, a third valve controlling transmission of fluid pressure operating the saddle, a fourth valve actuated responsive to table movement relative to the saddle for co-acting with the second valve in determining direction of table movement, the third valve being actuated responsive to movement of the fourth valve, and conduits for fluid pressure supplied to and discharge thereof from the valves.

2. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, a third valve controlling transmission of fluid pressure to the saddle, a fourth valve co-acting with the second valve and determining the direction and extent of movement of the table, the third and fourth valves connected with the table, a control connected with the fourth valve for adjustable engagement with the saddle for actuation of the fourth valve from movement of the table relative to the saddle, the third valve being actuated responsive to movement of the fourth valve, and conduits connecting the valves with the motors.

3. In a system for controlling the fluid pressure actuated movement of the knee and table and saddle motors of a milling machine according to a pattern on the table adjacent a workpiece, the combination of a first valve for controlling transmission of fluid pressure to the knee motor for continuous rotation thereof in either direction, a second valve in part controlling transmission of fluid pressure to the table motor for continuous rotation thereof in either direction, a tracer mounted on the machine and following the pattern contours and movement thereby for actuating the first and second valves, a third valve controlling transmission of fluid pressure to the saddle motor for intermittent to and fro movement thereof, a fourth valve actuated responsive to table movement relative to the saddle and co-acting with the second valve in controlling table movement the controlling movement of the third valve, the third valve being actuated responsive to movement of the fourth valve, and conduits connecting the valves with the motors.

4. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, the first and second valves sliding in their housings for transmission and cut-off of pressure, means for adjusting the positions of the said valves within their housings and for tending to return the valves to adjusted position, a tracer mounted on the machine and following the pattern contours and movement thereby for actuating the first and second valves responsive to differences in pattern contours, a third valve controlling transmission of fluid pressure to the saddle, a fourth valve actuated responsive to table movement relative to the saddle for co-acting with the second valve in controlling table movement and controlling movement of the third valve, the third valve being actuated responsive to movement of the fourth valve, and conduits connecting the valves with the motors.

5. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, the first and second valves sliding in their housings for transmission and cut-off of pressure, means for imposing a rotary oscillation on the first and second valves to minimize the effect of inertia on the valves, means for adjusting the positions of the valves within their housings and for tending to return the valves to adjusted position, a tracer mounted on the machine and following the pattern contours and movement thereby for actuating the first and second valves responsive to differences in pattern contours, a third valve controlling transmission of fluid pressure to the saddle motor, a fourth valve actuated responsive to table movement relative to the saddle for co-acting with the second valve in controlling table movement, the third valve being actuated responsive to movement of the fourth valve, and conduits connecting the valves with the motors.

6. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, the first and second valves sliding in their housings for transmission and cut-off of pressure, hydraulic means for imposing a rotary oscillation on the first and second valves to minimize the effect of inertia thereon, the hydraulic oscillating means comprising a piston and a valve for controlling application of fluid pressure to the piston, the piston being connected with the first and second valves for positive movement thereof and being resiliently connected to the oscillating valve for impositive movement thereof, a tracer mounted on the machine and following the pattern contours and movement thereby for actuating the first and second valves responsive to differences in pattern contours, a third valve controlling transmission of fluid pressure to the saddle, a fourth valve actuated responsive to table movement relative to the saddle for co-acting with the second valve in controlling table movement, the third valve being actuated responsive to movement of the fourth valve, and conduits connecting the valves with the motors.

7. The fluid pressure-operated system of claim 6 in which a detent acts on the valve of the oscillating means for delaying actuation thereof until after beginning of movement of the piston in either direction.

8. The fluid pressure-operated system of claim 6 in which movement of the oscillating means piston acts through a spring on the valve therefor in each direction of piston movement, and a spring-pressed detent acts on the valve for delaying actuating thereof until after beginning of movement of the piston in either direction.

9. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, the tracer being mounted for axial and tilting movement by the pattern, a leverage for transmitting axial and tilting tracer movement to the first and second valves, a third valve controlling transmission of fluid pressure to the saddle, a fourth valve actuated responsive to table movement relative to the saddle for co-acting with the second valve in controlling table movement, the third valve being actuated responsive to movement of the fourth valve, and conduits connecting the valves with the motors.

10. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, the tracer being mounted for axial and rotational and tilting movement by the pattern, a leverage for transmitting axial and tilting tracer movement to the first and second valves, means for voluntarily adjusting and amplifying valve movement of the leverage regardless of tracer action thereon, a third valve controlling transmission of fluid pressure to the saddle motor, a fourth valve actuated responsive to table movement relative to the saddle for co-acting with the second valve in controlling table movement, the third valve being actuated responsive to movement of the fourth valve, and conduits connecting the valves with the motors.

11. The fluid pressure-operated system of claim 8 in which an adjustable stop actuated by movement of the knee in one direction acts on the leverage transmitting movement of the tracer to the first and second valves and superseding action of the tracer and limiting movement of the knee in the said one direction.

12. The fluid pressure-operated system of claim 8 in which an adjustable stop is mounted adjacent the tracer movement transmitting leverage for acting thereof and limiting movement thereof in one direction.

13. The fluid pressure-operated system of claim 8 in which an adjustable stop is mounted adjacent the tracer movement transmitting leverage for acting thereof and limiting movement thereof in one direction and a stem associated with the stop and movable relative thereto for acting on the leverage to interrupt transmission of fluid through the first and second valves respectively to the knee and the table motors.

14. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, a third valve controlling transmission of fluid pressure to the saddle motor, the third valve being biased toward one position, a fourth valve actuated responsive to table movement relative to the saddle for co-acting with the second valve in controlling table movement, and a detent engaged with and actuated by the third valve for delayed admission of pressure to move the fourth valve intermittently in one direction for transmission of pressure to the saddle motor.

15. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, a third valve controlling transmission of fluid pressure to the saddle, a fourth valve actuated responsive to table movement relative to the saddle for co-acting with the second valve in controlling table movement, the third valve being actuated responsive to movement of the fourth valve, an adjustable stop actuated by movement of the knee in one direction for superseding action of the tracer and limiting movement of the knee, and conduits connecting the valves with the motors.

16. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, a saddle motor having an oscillatory piston vane connected with the saddle for moving the saddle, means for varying the arc of oscillation of the saddle motor vane for predetermining increments of saddle movement in either direction thereof, a third valve controlling transmission of fluid pressure to the saddle motor, a fourth valve actuated responsive to table movement relative to the saddle for co-acting with the second valve in controlling table movement, the third valve being actuated responsive to movement of the fourth valve, and conduits connecting the valves with the motors.

17. In a system for controlling the fluid pressure actuated movement of the knee and table and saddle motors of a milling machine according to a pattern on the table adjacent a workpiece, the combination of a first valve for controlling transmission of fluid pressure to the knee motor, a second valve in part controlling transmission of fluid pressure to the table motor, a tracer mounted on the machine and following the pattern contours and movement thereby for actuating the first and second valves responsive to differences in pattern contours, a saddle motor having a piston operatively connected for moving the saddle, means for voluntarily changing the direction of the power stroke of the saddle motor piston, means for varying the stroke of the saddle motor piston for predetermining increments of saddle movement, a third valve controlling transmission of fluid pressure to the saddle motor, a fourth valve actuated responsive to table movement relative to the saddle for co-acting with the second valve in controlling table movement, the third valve being actuated responsive to movement of the fourth valve, and conduits connecting the valves with the motors.

18. The fluid pressure-actuated system of claim 12 in which the means for changing direction of the saddle motor piston includes a ratchet wheel connected with the piston and a pawl manually adjustable to engage an end thereof with the ratchet dependent on the direction of movement desired for the piston.

19. The fluid pressure-actuated system of claim 12 in which the means for varying the stroke of the saddle motor piston includes a plurality of pins severally extending from the motor housing into grooves in a ring rotatable relative to the housing.

References Cited in the file of this patent

UNITED STATES PATENTS

| | | |
|---|---|---|
| 1,959,178 | Sassen | May 15, 1934 |
| 2,120,196 | Wright | June 7, 1938 |